Figure 3:
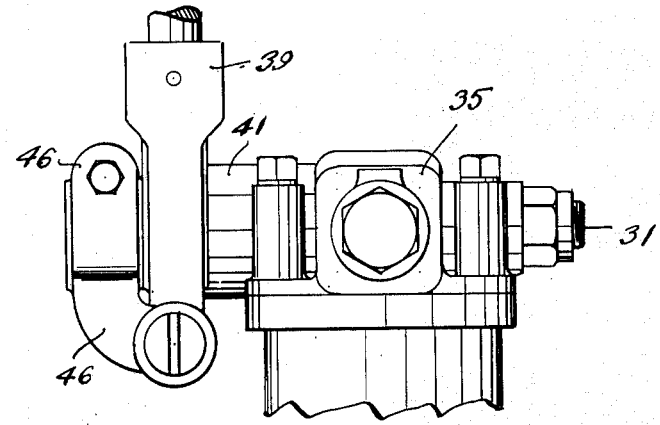

Dec. 25, 1928.
C. E. F. AHLM
1,696,178
TRANSMISSION GEARING
Filed March 14, 1925    6 Sheets-Sheet 1
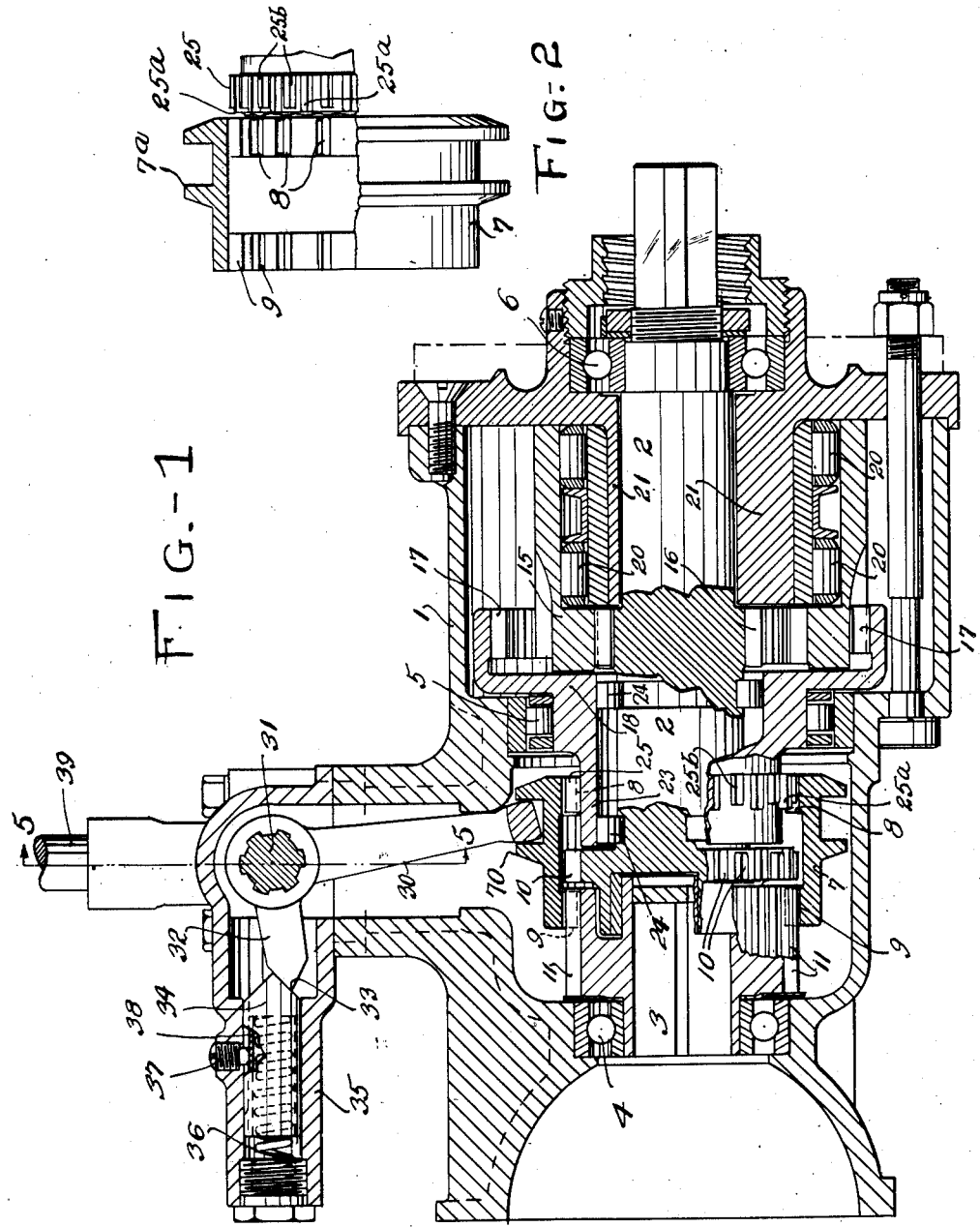
Inventor
Charles E. F. Ahlm
By Bates, Macklin,
Fulrick & Tears Attorneys Dec. 25, 1928. 1,696,178
C. E. F. AHLM
TRANSMISSION GEARING
Filed March 14, 1925   6 Sheets-Sheet 2

Inventor
Charles E. F. Ahlm
By Bates, Macklin,
Tolrick & Tears  Attorneys

Dec. 25, 1928.                                              1,696,178
C. E. F. AHLM
TRANSMISSION GEARING
Filed March 14, 1925         6 Sheets-Sheet 4

Inventor
Charles C. F. Ahlm
By Bates, Macklin,
Golrick & Teare   Attorneys

Dec. 25, 1928.
C. E. F. AHLM
1,696,178
TRANSMISSION GEARING
Filed March 14, 1925
6 Sheets-Sheet 5
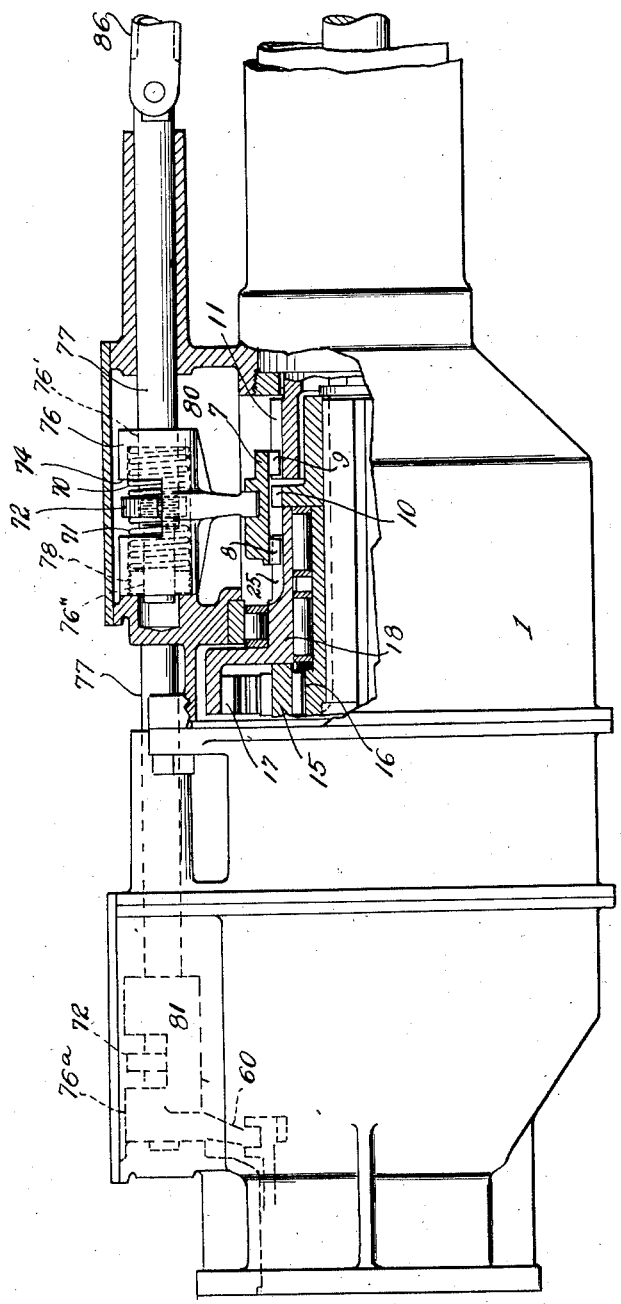
Inventor
Charles E. F. Ahlm
By Bates, Macklin
Goliuh & Teare Attorneys

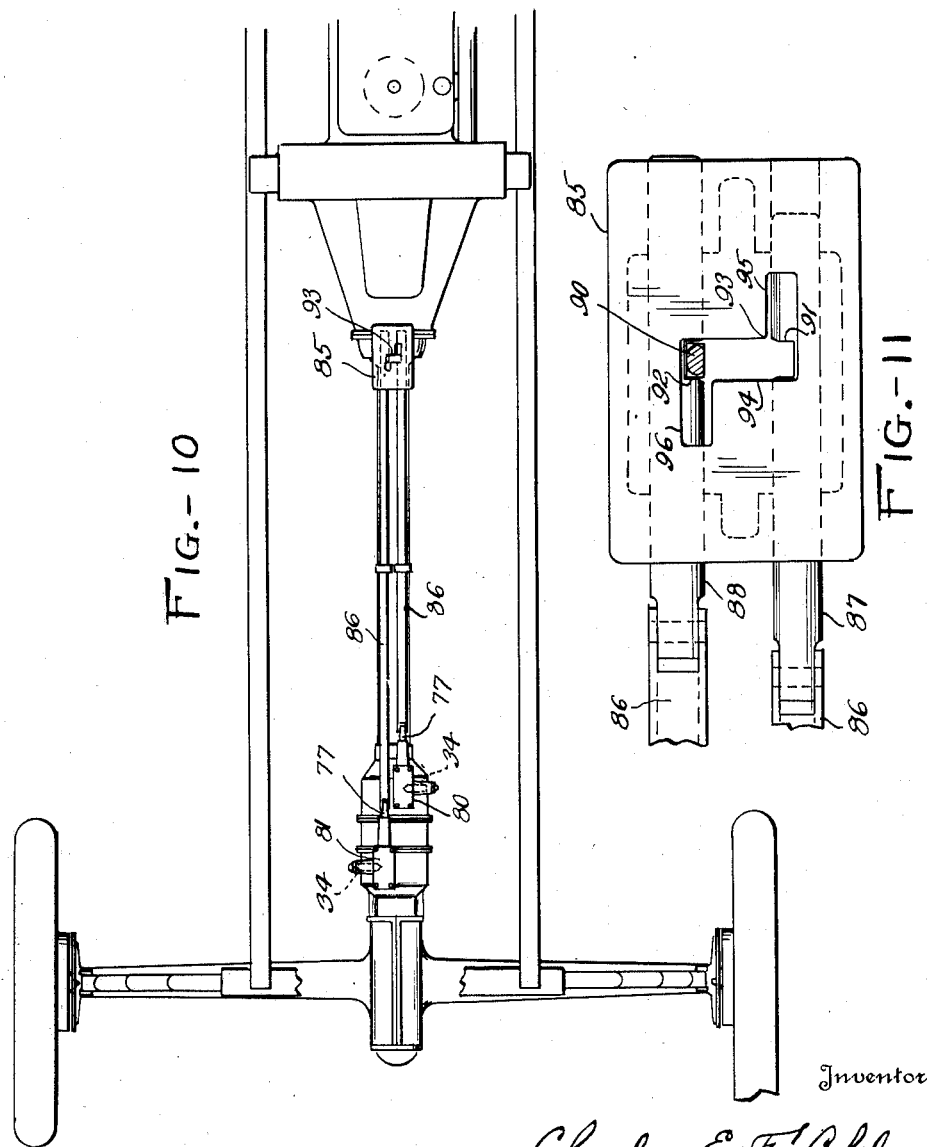

Patented Dec. 25, 1928.

1,696,178

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed March 14, 1925. Serial No. 15,480.

This invention relates to change speed gearing for transmission gearings. Its primary purpose is to so connect the manually operable shifting means with the clutch, or gear changing mechanism, that there shall be no appreciable interval of time required for the shift or no possibility of the shifting member stopping in its neutral position. The mechanism of the invention is so arranged as to cause the shifting member to either pass from one gear speed position to another gear speed position, or if the operator has not completed the movement past the neutral point, the clutch member will be moved back into the position started from.

In other words, the present invention is concerned with a mechanism which will automatically cause the shift members to be moved completely into either of its running positions, and shall prevent it coming to rest in the intermediate position between the two clutching positions.

The invention is particularly useful in connection with the use of auxiliary transmission gearings where there is considerable mechanism between the auxiliary gearing and the change gearing or clutch mechanism of the standard equipment, the inertia of which renders the difficulty of shifting after an interval of time very likely to prevent subsequent engagement of the clutching members.

In connection with the use of a means for preventing the clutch mechanism from stopping in a neutral position, it is desirable to use a special clutch arrangement, the teeth of which are caused to engage positively and very quickly without a possibility of them coming to rest on the ends of the teeth, thus, stopping the shifting movement in a position where the ends of the clutch teeth are merely rubbed across the ends of the others by reason of the relative movement of the parts.

Other objects and features of the invention as well as the operation thereof will become apparent from the following description which relates to the accompanying drawings. The invention is defined in the claims.

Figure 4:
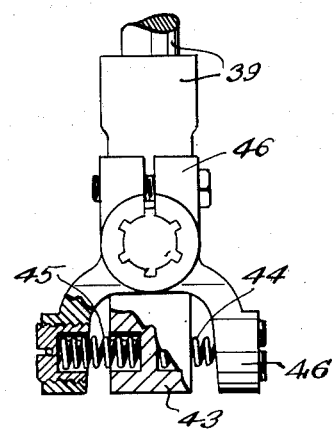
Figure 5:
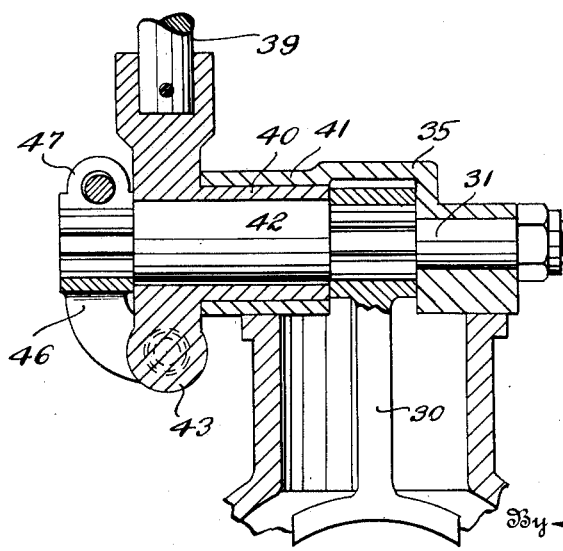
Figure 6:
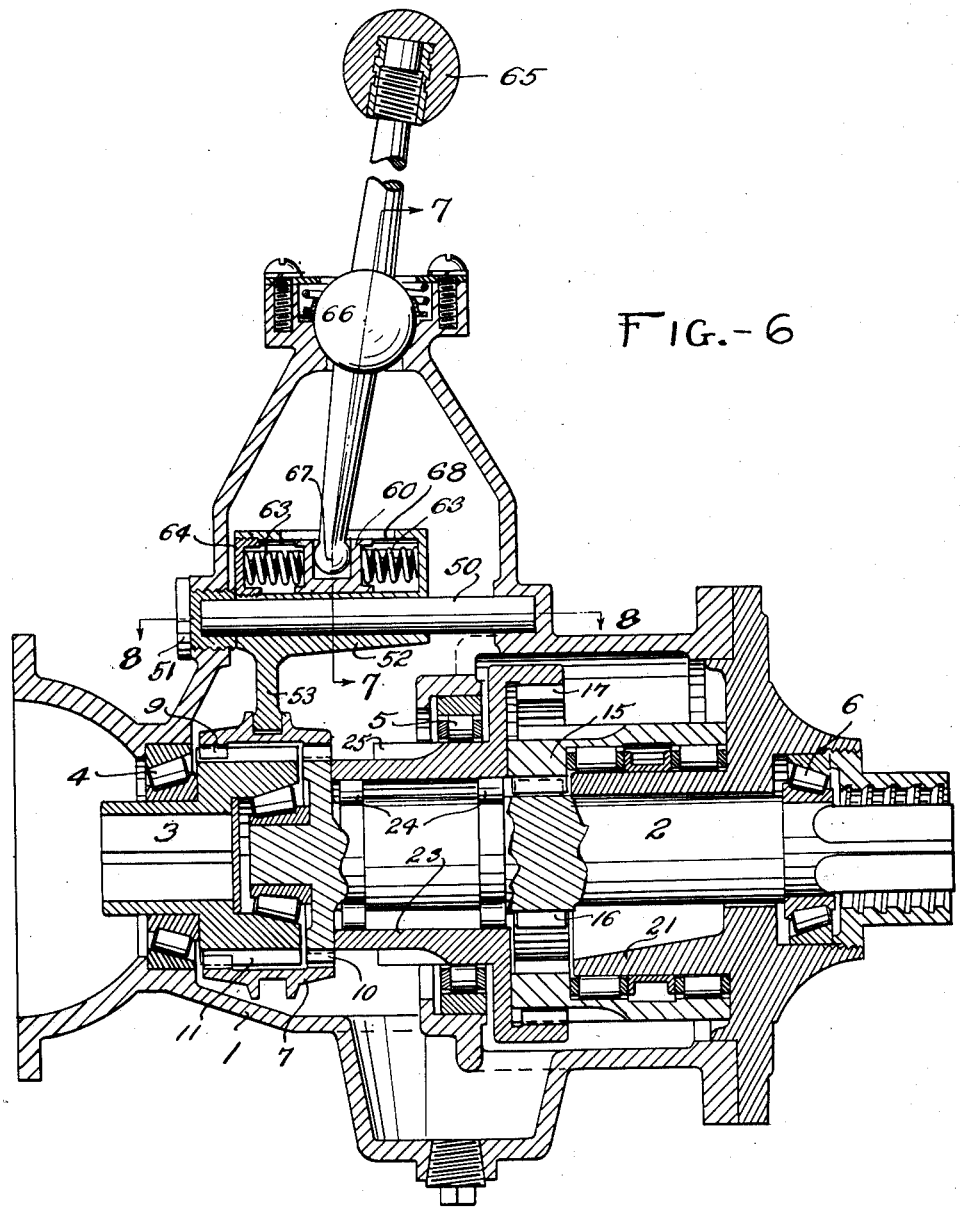
Figure 7:
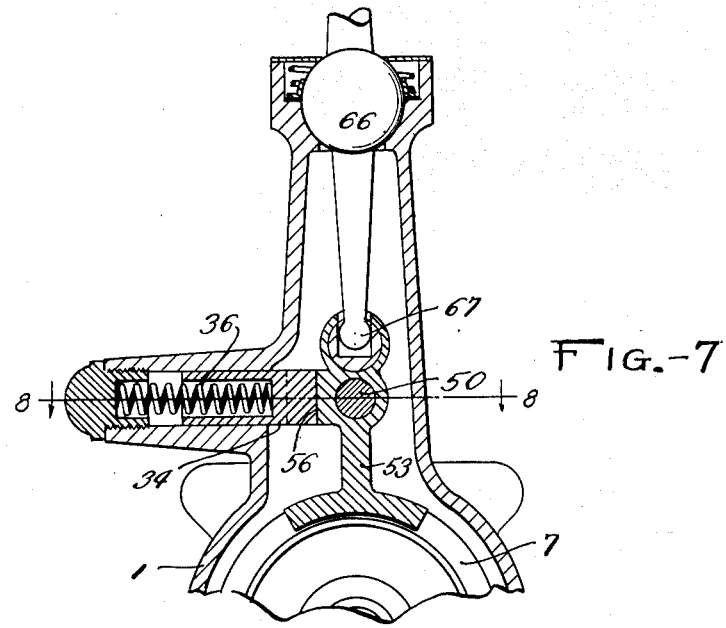
Figure 8:
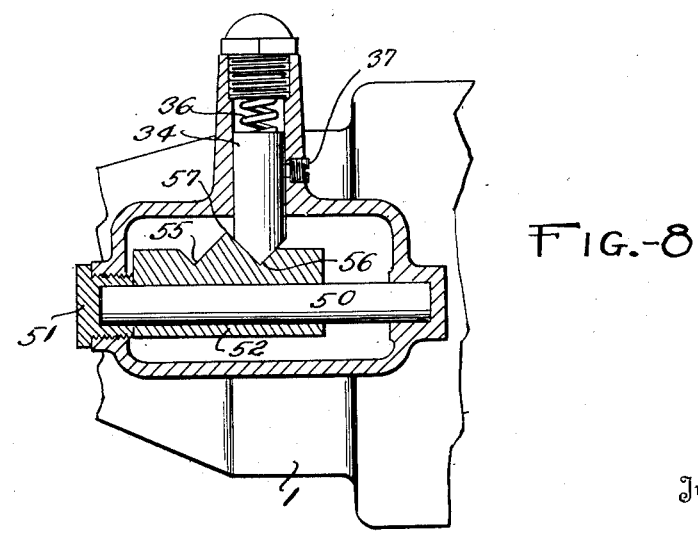

In the drawings Fig. 1 is a substantially central longitudinal cross sectional view of a gearing with which my invention is adapted to cooperate; Fig. 2 is a fragmentary sectional side elevation of a pair of cooperating clutching members; Fig. 3 is a fragmentary side elevation of the upper portion of a gear casing and one form of my shifting mechanism; Fig. 4 is a fragmentary sectional end elevation of the parts shown in Fig. 3; Fig. 5 is a cross section taken along the line 5—5 on Fig. 1; Fig. 6 is a central longitudinal section through a gearing with a modified form of shifting mechanism embodied therein; Fig. 7 is a fragmentary transverse cross section as indicated by the line 7—7 on Fig. 6; Fig. 8 is a sectional plan as indicated by the line 8—8 in Fig. 7; Fig. 9 is a side elevation of gearing with my shifting mechanism arranged to effect combinations of gear changes; Fig. 10 shows this gearing in plan and supported in position on the chassis of an automobile; Fig. 11 is a fragmentary view on a larger scale of a convenient shifting bar operating device.

Referring in detail first to Fig. 1, I have shown a gearing mounted in a suitable casing 1 and having a driving member or shaft 2 and a driven member 3. The shafts may be conveniently supported on roller bearings 4, 5 and 6. As shown the members 2 and 3 are arranged to be connected for either simultaneous or relative rotation by reason of a slidable clutch ring 7 having gear like teeth 8 and 9. The teeth 9 are slidable along and in constant engagement with the teeth 11, and the teeth 8 are capable of engagement with either teeth 10, rigid with the member 2, or teeth 25 of a gear 18 having a connection with the member 2 which will be later described.

The ends of the teeth 10 and 25 are staggered as shown in Figs. 1 and 2, certain of the teeth being dropped back of the others, while the teeth 8 are shown as less in number than the teeth 10 or 25. By this arrangement it is very easy to bring the teeth into mesh while there is considerable difference in the speed of each member. This is shown especially in Fig. 2 wherein the teeth 25$^a$ are shown as projecting beyond the teeth 25$^b$, and the teeth 8 on the shiftable clutch are shown spaced twice as far apart as the teeth 25. When a shift is made the right hand ends of the teeth 8 will first impinge against the projecting ends of the teeth 25$^a$ and then slide along the teeth to go completely into mesh. By reason of the rapidity of the longitudinal movement imparted to the member 7 by my mechanism to be presently described, the spaced apart teeth have plenty of time to drivingly engage the teeth 25ᵃ while if the teeth 25 were all the same length there might be a tendency for the teeth 8 to stutter along the ends of the teeth 25 and not go into mesh.

The shaft 2 is also arranged to be connected to the driven member by means of a reduction gearing such as an internal-external gear 15 shown as meshing with pinion teeth 16 on the shaft 2 and with internal gear teeth 17 on the gear member 18.

The gear 15 may be carried by roller bearings 20 supported by a relatively stationary eccentric tubular extension 21 projecting inwardly from the casing. The gear member 18 is shown as having a tubular rearward extension 23 which contains rollers 24 bearing against and directly supporting one end of the shaft 2 and as carrying the clutch teeth 25.

With the clutch member 7 in the position shown the driving shaft pinion will drive the internal-external gear at a reduced speed, and the gear 17 will be driven at a still further reduced speed which, by reason of the dental clutch connection to the teeth 11 on the driven member, will be the propeller speed.

The general principles of the above described gearing are shown and claimed in my prior application filed June 30, 1924, Serial Number 723,153. The present invention relates in part to the manner of shifting from one speed to another in such a gearing.

For effecting the shifting of the clutch member 7, I have shown mechanism which includes a shipper lever 30 engaging the usual flanges 7ᵃ on the clutch member and rigid on a rock shaft 31. The lever has an arm 32 which has a double beveled end 33, the beveled surfaces being arranged to be engaged by the similarly shaped end of a spring pressed plunger 34. The plunger may be carried by a removable portion 35 of the casing and may be urged forwardly by a compression spring 36 which may extend from the greater part within an opening in the plunger as shown. A screw 37 having a reduced inner end engaging a slot 38 in the plunger may serve to hold the wedge points of the plunger and arm 32 parallel.

It is apparent that when the rock shaft is rotated to cause the plunger and arm to be aligned, the teeth 8 are just out of contact with both sets of teeth 10 and 25, and then assuming that the point of the arm is carried over the point of the plunger the spring 36 will act with sufficient force and speed to rotate the arm 32 and throw the desired clutch teeth into mesh.

The manual operating means for turning the rock shaft may comprise a lever 39 (Figs. 3 to 5) having a tubular member 40 freely mounted in a bearing position 41 of the casing and surrounding an enlarged smooth portion 42 of the rock shaft. The lever has an oppositely recessed depending portion 43 and into the recesses extend springs 44 and 45 arranged to react at their outer ends on the depending arms of a yoke 46 shown as clamped at 47 and splined to the rock shaft.

Suppose it is desired to shift from the position shown in Fig. 1 to direct drive. The lever 39 would be rotated to the right (left in Fig. 4) compressing the spring 44 and taking up nearly all the space shown between the portion 43 of the manual lever and the respective arm of the lever member 46. Continued movement then turns the rock shaft until the wedge points are brought together and then the spring 44 insures the wedge points passing and aids the plunger in throwing the arm 32 upwardly to effect the clutch shift.

It will be readily understood from the above description that I have provided against the gearing remaining in neutral, even though the speeds of the members to be connected are not synchronized. Should the wedge points wear until there are two substantially flat ends engaging each other as the plunger and arm 32 are brought to alignment, one of the necessarily compressed springs will expand as the reaction thereagainst (present while retracting the plunger) is removed. It should be noted that there is practically no chance of the operator's hand on the lever 39 or the inertia of the lever itself deterring the quick operation of the plunger spring in shifting for, when shifting, one of the springs 44 or 45 is first compressed and the loose play between the member 43 and the arm 46 on the side opposite the compressed spring is sufficient to allow the free turning of the rock shaft independently of the operating lever.

It is to be remarked that without the staggered and spaced tooth arrangement previously described the difference of speeds of rotation of the teeth 8 and 10 or 25 might in same cases be too great to allow the gear teeth to enter. However, it would be hard to conceive of a gear speed difference, at which gears could stand the shock of shifting, such that by the use of my combined mechanism a complete shift could be made.

In Figs. 6 to 8 I have illustrated a modified form of shifting mechanism in connection with a gearing that so far as this invention is concerned may be said to be the same in operation as the gearing shown in Fig. 1. For the sake of brevity, I will duplicate the reference characters corresponding to similar parts of the first embodiment.

My shifting mechanism as shown in this embodiment comprises a bar, mounted in parallel relation to the shafting, upon which the spring equipped shifter head is slidably mounted. Any operating device might be substituted for the ball lever shown in Fig. 6. The bar is indicated at 50 and is arranged to be removably carried at one end by a socket nut 51. The bar supports a shifter head 52 having a depending arm 53 in engagement with the clutch member 7. One side of the head 52 as shown in Figs. 7 and 8 carries a pair of notches 55 and 56 into which a wedge pointed plunger is adapted to extend. The parts of this plunger are substantially the same as the plunger 34 of Fig. 1 and the operation is very much the same with respect to the intersecting surfaces extending from the wedge point 57 on the head.

Corresponding to the free pivot connection of the first group of figures, I have shown a sliding member 60 mounted in a recess 61 extending parallel to the bar 50. Springs 63 are balanced against this member, both the springs and sliding member being arranged to be removed from the head through an opening at one end of the recess normally closed by a threaded cap 64 against which one of the springs reacts.

A suitable shifting lever having an operating handle 65 and a ball pivot 66 may have a ball end 67 extending into an upwardly facing recess in the member 60. The shifting lever is permitted to compress one of the springs 63 before the head is shifted forwardly or rearwardly by reason of a slot 68 in the upper wall of the head 52. The operation is substantially the same as before, certain advantages being had over the other form by reason of more equal distribution of forces.

In Fig. 9 I have shown a combination transmission which is capable of transmitting a reduced speed, direct drive and an overspeed. The gearing itself forms the subject of my copending application, Serial No. 20,837 filed April 4, 1925. The gearing is adapted to be used adjacent the rear axle of a car and to connect the shortened section of the propeller shaft with the differential gearing.

The shifting device employs substantially the same principle as the other forms, the balanced spring members being somewhat modified by reason of its position near the rear of the car. In Fig. 9 I have shown the transmission casing broken away to show a portion of the gearing similar to that shown in Fig. 1, the reference characters on the parts corresponding to those of Fig. 1 being used in this figure. The clutch member 7 is arranged to be acted upon by a depending arm 75 extending from a shiftable head 76 slidable on a bar 77. The head may be equipped with a plunger and notches similar to those shown in Fig. 8, such a plunger 34 being indicated in dotted lines in Fig. 10.

The bar 77 is shown as slidably mounted in a forwardly projecting portion of the casing and is also slidable in the head 76 itself by reason of bearing surfaces 76' and 76" carried by the head and by a threaded nut 78. The nut 78 is shown as closing one end of a recess for a pair of balanced springs 70 and 71 normally forcing against a nut 72 threaded on the bar 77 and holding the nut in central position as shown.

The nut may move relative to the head 76 by reason of the notch 74 in the head, the notch being wide enough to permit a sufficient compression of one of the springs, to insure the head being thrown past the dead center position when the wedge points are aligned as before. It will be seen that by providing the sliding resilient connection between the bar and head, the weight of the bar is independent of the head and does not drag back on the head when the shift is made.

Assuming that one of the shifting mechanisms just described, indicated at 80 on Fig. 9 effects a reduction of speed and the other indicated at 81 an increased speed, it will be apparent that means needs to be provided to insure each of the gear units being shifted with proper relation to the other. In this gearing (which is more fully explained in my copending application, Serial No. 20,837) when the shifting head 76 is in its rearmost position as shown in Fig. 9, the internal external reduction gearing will transmit an increased speed to the driven member, by reason of clutching the driving member to the external gear member 18. At this time the shifter head 76ª shown in dotted lines in Fig. 9 must also be in its extreme left hand position in order to couple an intermediate driving member to a driven member such as the worm shaft of a worm gear drive for the automobile axle.

The relation of shifting heads for a reduced drive is with both the heads 76 and 76ª shifted to the right; and to effect direct drive with the gearing shown, one of the shifting heads, namely 76 is shifted to the right to clutch the members 10 and 11 together while the other head is shifted to the left to make a similar direct connection between the worm shaft and the intermediate shaft.

In order to provide against the possibility of any but these three relations occurring, I preferably provide a shift bar housing, a portion of which is provided with a slot which limits the movement of the manual shifting lever. Such a housing is shown at 85. Links 86 connected to shifter bars 87 and 88 in the housing provide connection between the bars 63 and the shifter lever which is indicated at 90. Each of the bars 87 and 88 have inwardly facing notches 91 and 92 and the slot above referred to may comprise an opening 93 extending transversely of the movement of the bars as at 94 and parallel to the bars at 95 and 96. The shifter lever 90 may move through the transverse portion of the slot to engage either of the notches and pick up the desired bar. As shown in Fig. 10 the bar 87 is shown in its rearward position and the bar 88 in its forward. The result of so positioning the bars is to effect direct drive.

Now if it is desired to shift into high or overspeed, the movement of the shifter lever 90 carries the bar 88 to the left which carries the shifter heads 61 and 61ª into the position shown in Fig. 9, and it will be seen that in order to shift the bar 87 forward for a reduced speed, the bar 88 will also have to be shifted forward to the position shown in Fig. 10 where it will remain while the lever 90 is moved through the transverse portion of the slot to pick up the other bar and carry it forward.

It will be seen that I have provided a very simple means for shifting gear members which will effectively prevent the gears from remaining in neutral position. I am aware that the invention is capable of other adaptations and I do not wish to limit the scope of the invention by unnecessary details.

Having thus described my invention, I claim:

1. In combination with a change speed gearing, a shifting member having a pair of intersecting surfaces, a spring pressed member arranged to coact alternately with said surfaces, a pair of oppositely acting springs bearing against the shifting members, means for moving said shifting member arranged to first flex one of the springs by a movement in one direction and by a further movement to cause the shifting member to move and to place the spring pressed member in position to engage the other surface, the flexed spring then acting to insure such engagement.

2. In combination with a change speed gearing, a gear shifting member adapted to carry gear or clutch teeth out of mesh with one set of teeth and into another, a spring pressed plunger having a movement transverse to the movement of the shifting member, a cam carried by said plunger capable of forcing against opposed cam surfaces on the shifting member to quickly move the shifting member to either of its two positions, and of then acting as a detent to maintain the selected position, opposed compression springs bearing against said shifting member, an operating member having a portion thereof extending between the springs whereby movement of the operating member may first compress one of the springs and then bodily move the shifting member to store up energy in the spring of the plunger, the said compressed spring acting when the plunger has been moved to its extreme retracted position to move the shifting member independently of the operating member to bring the adjacent cam surface of the shifting member into coaction with the cam of the plunger.

3. In combination with a gearing having a shiftable element, a movably mounted hollow member having a connection therewith, a spring contained thereby, an operating member extending into the hollow member and movable relatively thereto, said operating member engaging the spring and arranged to first flex the same and then to abut the hollow member to move it, and a wedge shaped spring pressed plunger arranged to be retracted by such movement of the hollow member and to thereafter act independently of the operating member to move the hollow member to a definite position of rest.

4. In a gearing, a movable member having a connection with one of the gear elements, an operating member having a movement in opposite directions relative to the movable member and arranged to engage the same and move it at the end of each relative movement, a wedge shaped spring pressed plunger arranged to be retracted by a portion of such movement of the movable member and to thereafter act to move the movable member independently of the operating member.

5. A gear shifting mechanism comprising a shiftably mounted member having cam surfaces, a spring pressed plunger having complementary cam surfaces cooperating therewith to move the member in opposite directions, an operating member arranged to move in opposite directions relative to the first named member and to abut the same after such relative movement in either direction and to thereafter move it to retract the plunger and resilient means interposed between said operating member and shiftably mounted member arranged to be stressed by movement of the operating member in either direction.

6. Shifting mechanism comprising a movably mounted member adapted to be connected with an element to be shifted, resiliently stressed means arranged to force said member away from a central position to two extreme positions, an operating member and a two way lost motion resilient connection between the operating member and the movably mounted member.

7. In a gearing a dental element having a neutral position and two operating positions one each side of the neutral position, constantly acting means tending to maintain the element in one operating position or the other, and manual control means having a two way resilient lost motion connection with the first named means.

8. In a gearing having an element to be shifted to two positions, a member movable parallel to said element and connected therewith, resiliently stressed means bearing against said member to cause it to move from a central position to either of two extreme positions, an operating member and a two way lost motion resilient connection between the operating member and said movable member.

In testimony whereof, I hereunto affix my signature.

CHARLES E. F. AHLM.